United States Patent
Xue et al.

(10) Patent No.: US 10,644,952 B2
(45) Date of Patent: May 5, 2020

(54) VNF FAILOVER METHOD AND APPARATUS

(71) Applicant: HUAWEI TECHNOLOGIES CO., LTD., Shenzhen (CN)

(72) Inventors: Yifei Xue, Shanghai (CN); Hai Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 182 days.

(21) Appl. No.: 15/853,958

(22) Filed: Dec. 25, 2017

(65) Prior Publication Data

US 2018/0123870 A1 May 3, 2018

Related U.S. Application Data

(63) Continuation of application No. PCT/CN2015/082997, filed on Jun. 30, 2015.

(51) Int. Cl.
*H04L 12/24* (2006.01)

(52) U.S. Cl.
CPC ...... *H04L 41/0893* (2013.01); *H04L 41/0663* (2013.01); *H04L 41/0668* (2013.01)

(58) Field of Classification Search
CPC ... G06F 11/2023–2033; H04L 41/0663; H04L 41/0668; H04L 41/0893; H04L 41/50; H04L 67/1034
USPC ...................................... 714/4.11
See application file for complete search history.

(56) References Cited

U.S. PATENT DOCUMENTS

| 8,510,590 B2* | 8/2013 | Ji ................... G06F 11/1438 714/3 |
| 8,918,490 B1* | 12/2014 | Rattner ............ H04L 41/0816 709/223 |
| 9,594,649 B2* | 3/2017 | Yang ................ G06F 11/202 |
| 2013/0275808 A1* | 10/2013 | McNeeney ........ G06F 11/1482 714/20 |

(Continued)

FOREIGN PATENT DOCUMENTS

| CN | 104137482 A | 11/2014 |
| CN | 104170323 A | 11/2014 |

(Continued)

*Primary Examiner* — Joseph R Kudirka
(74) *Attorney, Agent, or Firm* — Kilpatrick Townsend & Stockton LLP

(57) ABSTRACT

The present invention discloses a virtualized network function (VNF) failover method and apparatus, so as to resolve a problem that an affinity policy cannot be compatible with a high availability (HA) mechanism in a network functions virtualization (NFV) scenario. The method is: receiving, by a management and orchestration (MANO} system, a fault message, where the fault message indicates a first VNF is faulty; determining, by the MANO system, a primary affinity group to which the first VNF belongs and a secondary affinity group corresponding to the primary affinity group, where VNFs in the secondary affinity group are in a one-to-one correspondence with VNFs in the primary affinity group, and the affinity group represents a set of VNFs on which an affinity policy is used; and instructing, by the MANO system, the VNFs in the secondary affinity group to continue to process services of the VNFs in the primary affinity group.

17 Claims, 4 Drawing Sheets

(56) References Cited

U.S. PATENT DOCUMENTS

| | | | |
|---|---|---|---|
| 2014/0059379 A1* | 2/2014 | Ren | G06F 11/1438 |
| | | | 714/3 |
| 2014/0201374 A1 | 7/2014 | Ashwood-Smith et al. | |
| 2015/0082308 A1 | 3/2015 | Kiess et al. | |
| 2016/0224409 A1 | 8/2016 | Liu et al. | |
| 2017/0031623 A1 | 2/2017 | Gong et al. | |
| 2017/0300352 A1 | 10/2017 | Lou et al. | |
| 2018/0018193 A1* | 1/2018 | Yabushita | G06F 11/20 |

FOREIGN PATENT DOCUMENTS

| | | | | |
|---|---|---|---|---|
| CN | 104253866 A | 12/2014 | | |
| CN | 104320274 A | 1/2015 | | |
| CN | 104468688 A | 3/2015 | | |
| CN | 104636184 A | 5/2015 | | |
| EP | 3119034 A1 | 1/2017 | | |
| JP | 2016509412 A | 3/2016 | | |
| WO | 2015042937 A1 | 4/2015 | | |
| WO | 2015091964 A1 | 6/2015 | | |
| WO | WO-2016050663 A1 * | 4/2016 | | H04L 41/0668 |
| WO | WO-2016093861 A1 * | 6/2016 | | H04L 41/0631 |
| WO | WO-2016121830 A1 * | 8/2016 | | G06F 11/20 |

\* cited by examiner

VNF FAILOVER METHOD AND APPARATUS

CROSS-REFERENCE TO RELATED APPLICATIONS

This application is a continuation of International Patent Application No. PCT/CN2015/082997 filed on Jun. 30, 2015. The disclosure of the aforementioned application is hereby incorporated by reference in the entity.

TECHNICAL FIELD

The present invention relates to the field of communications technologies, and in particular, to a virtualized network function (VNF for short) failover method and apparatus.

BACKGROUND

In a network functions virtualization (NFV for short) technology, a user is allowed to explicitly specify a policy for a VNF set. The policy includes an affinity policy and an anti-affinity policy. The affinity policy is used to ensure that a VNF is deployed on a host in a specified host set. The anti-affinity policy is used to ensure that different VNFs in a same VNF set are deployed on different hosts.

In consideration of high availability and continuity requirements for a telecommunications-level service, a high availability (HA for short) cluster mechanism needs to be used to ensure continuity of a VNF service on a host when the host is faulty.

However, in an NFV scenario in which the affinity policy is specified, the affinity policy limits a VNF to being deployed on only one specified host. Once the host is faulty, the VNF on the host cannot be failed over to a secondary host. Therefore, a solution to resolving a problem that the affinity policy is incompatible with the HA mechanism in the NFV scenario is needed.

SUMMARY

Embodiments of the present invention provide a VNF failover method and apparatus, so as to resolve a problem that an affinity policy is incompatible with an HA mechanism in an NFV scenario.

According to a first aspect, an embodiment of the present invention provides a VNF failover method, including:

receiving, by a MANO system, a fault message, where the fault message indicates a first VNF is faulty;

determining, by the MANO system, a primary affinity group to which the first VNF belongs and a secondary affinity group corresponding to the primary affinity group, where VNFs in the secondary affinity group are in a one-to-one correspondence with VNFs in the primary affinity group, and the affinity group represents a set of VNFs on which an affinity policy is used; and instructing, by the MANO system, the VNFs in the secondary affinity group to continue to process services of the VNFs in the primary affinity group.

With reference to the first aspect, in a first possible implementation of the first aspect, the MANO system includes an NFVO and a VNFM;

the receiving, by a MANO system, a fault message includes:

receiving, by the NFVO, the fault message reported by the VNFM; and the determining, by the MANO system, a primary affinity group to which the first VNF belongs and a secondary affinity group corresponding to the primary affinity group includes:

determining, by the NFVO, the primary affinity group to which the first VNF belongs and the secondary affinity group of the primary affinity group.

With reference to the first possible implementation of the first aspect, in a second possible implementation of the first aspect, after the determining, by the NFVO, the primary affinity group to which the first VNF belongs and the secondary affinity group of the primary affinity group, the method further includes:

changing, by the NFVO, an attribute of the secondary affinity group and an attribute of the VNF in the secondary affinity group to primary attributes.

With reference to the first or the second possible implementation of the first aspect, in a third possible implementation of the first aspect, the fault message is reported by an agent of the secondary affinity group to the VNFM after the agent detects, by using a heartbeat mechanism, that the first VNF is faulty; or the fault message is reported by an NFVI to a virtualized infrastructure manager VIM after the NFVI detects a fault that is in the NFVI and that is to affect running of the first VNF, and then is reported by the VIM to the VNFM; or the fault message is notified by the NFVI to the first VNF after the NFVI detects a fault that is in the NFVI and that is to affect running of the first VNF, and then is reported by the first VNF to the VNFM.

With reference to any one of the first aspect, or the first to the third possible implementations of the first aspect, in a fourth possible implementation of the first aspect, the VNFs in the affinity group are distributed on one host, or are distributed on multiple hosts.

According to a second aspect, an embodiment of the present invention provides a VNF failover apparatus, including:

a receiving unit, configured to receive a fault message, where the fault message indicates a first VNF is faulty;

a determining unit, configured to determine a primary affinity group to which the first VNF belongs and a secondary affinity group corresponding to the primary affinity group, where VNFs in the secondary affinity group are in a one-to-one correspondence with VNFs in the primary affinity group, and the affinity group represents a set of VNFs on which an affinity policy is used; and a failover unit, configured to instruct the VNFs in the secondary affinity group to continue to process services of the VNFs in the primary affinity group.

With reference to the second aspect, in a first possible implementation of the second aspect, the receiving unit is specifically configured to:

receive the fault message reported by a VNFM.

With reference to the first possible implementation of the second aspect, in a second possible implementation of the second aspect, the apparatus further includes:

an update unit, configured to change an attribute of the secondary affinity group and an attribute of the VNF in the secondary affinity group to primary attributes.

With reference to the first or the second possible implementation of the second aspect, in a third possible implementation of the second aspect, the fault message is reported by an agent of the secondary affinity group to the VNFM after the agent detects, by using a heartbeat mechanism, that the first VNF is faulty; or the fault message is reported by an NFVI to a virtualized infrastructure manager VIM after the NFVI detects a fault that is in the NFVI and that is to affect running of the first VNF, and then is reported by the VIM to the VNFM; or the fault message is notified by the NFVI to the first VNF after the NFVI detects a fault that is in the NFVI and that is to affect running of the first VNF, and then is reported by the first VNF to the VNFM.

With reference to any one of the second aspect, or the first to the third possible implementations of the second aspect, in a fourth possible implementation of the second aspect, the VNFs in the affinity group are distributed on one host, or are distributed on multiple hosts.

By using the solutions provided in the embodiments of the present invention, the problem that the affinity policy cannot be compatible with the HA mechanism in the NFV scenario can be resolved, and management of the affinity policy and primary/secondary failover is centralized into the MANO, so as to avoid control capability decentralization.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The embodiments of the present invention provide a VNF failover method and apparatus. When receiving a fault message related to a VNF in an affinity group, an NFV management and orchestration system (NFV-MANO for short) triggers failover of all VNFs in the affinity group. The method and apparatus are based on a same inventive concept. Because a problem-resolving principle of the method is similar to that of the apparatus, for similar details, mutually refer to implementation of the apparatus and that of the method. No repeated description is provided herein.

Figure 1:
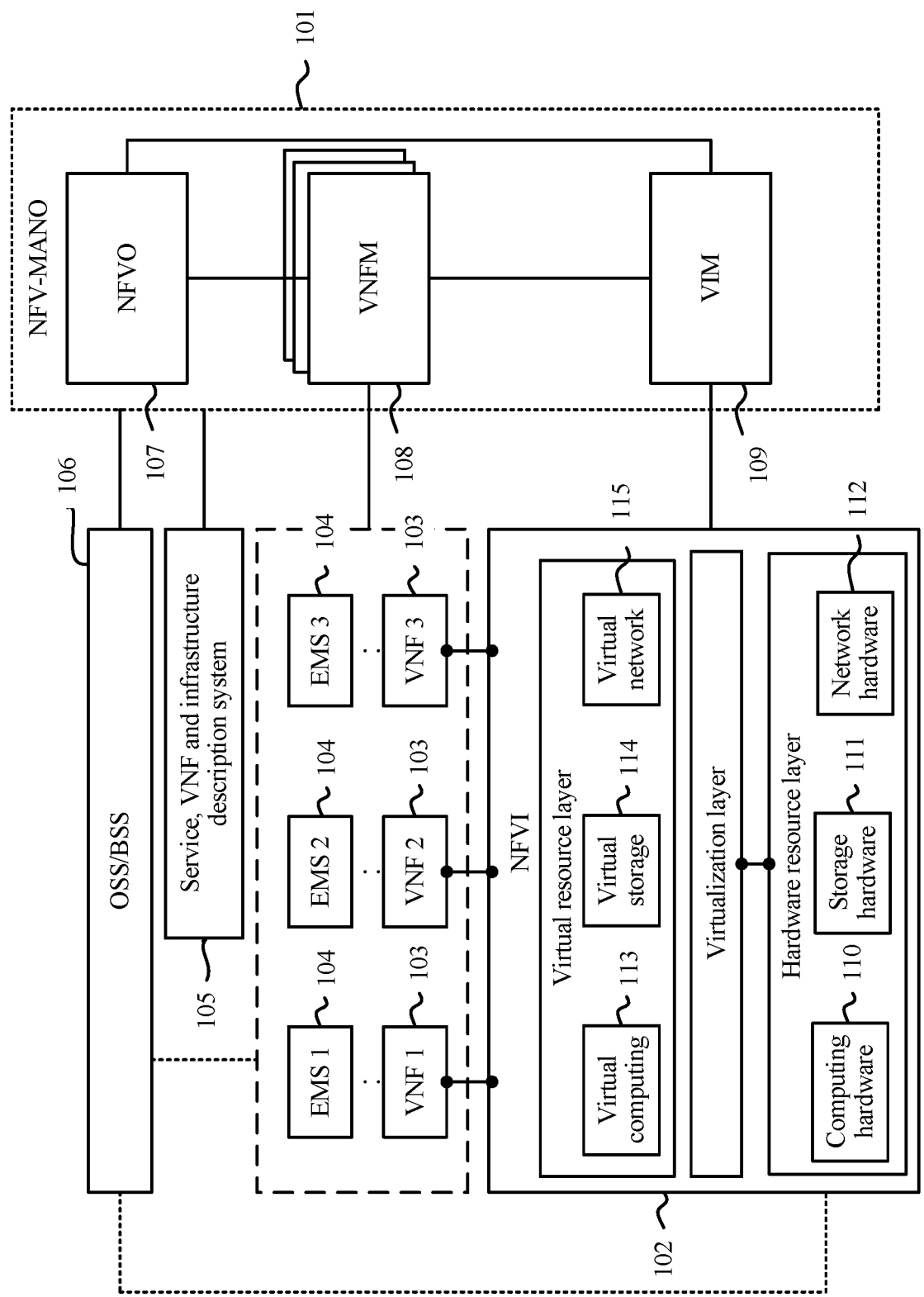
FIG. 1 is a schematic diagram of a system architecture of an NFV system according to an embodiment of the present invention.

As shown in FIG. 1, a schematic diagram of a system architecture of an NFV system is provided to describe an embodiment of the present invention. The NFV system may be implemented by using multiple networks, for example, a data center network, a service provider network, or a local area network (LAN for short). As shown in FIG. 1, the NFV system may include an NFV-MANO 101, an NFV infrastructure (NFVI for short) 102, multiple VNFs 103, multiple element management systems (EMS for short) 104, a service, VNF and infrastructure description system 105, and one or more operation support systems/business support systems (OSS/BSS for short) 106.

The NFV-MANO 101 may include a network functions virtualization orchestrator (NFVO for short) 107, one or more virtualized network function managers (VNFM for short) 108, and one or more virtualized infrastructure managers (VIM for short) 109. The NFVI 102 may include a hardware resource layer that includes computing hardware 110, storage hardware 111, and network hardware 112; a virtualization layer; and a virtual resource layer that includes virtual computing 113 (such as a virtual machine), virtual storage 114, and a virtual network 115.

The computing hardware 110 at the hardware resource layer may be a dedicated processor or a general-purpose processor configured to provide a processing and computing function. The storage hardware 111 is configured to provide a storage capability. The storage capability may be provided by the storage hardware 111 (for example, a local memory of a server), or may be provided by using a network (for example, a server is connected to a network storage device by using the network). The network hardware 112 may be a switch, a router, and/or another network device. The network hardware 112 is configured to implement communication between multiple devices. The multiple devices are connected in a wireless or wired manner.

The virtualization layer in the NFVI 102 is used to: abstract a hardware resource at the hardware resource layer, decouple the VNF 103 from a physical layer to which the hardware resource belongs, and provide a virtual resource for the VNF 103.

The virtual resource layer may include the virtual computing 113, the virtual storage 114, and the virtual network 115. The virtual computing 113 and the virtual storage 114 may be provided for the VNF 103 in a form of a virtual machine or another virtual container. For example, one or more VNFs 103 may be deployed on a virtual machine. The virtualization layer forms the virtual network 115 by abstracting the network hardware 112. The virtual network 115 such as a virtual switch (Vswitches) is configured to implement communication between multiple virtual machines or between multiple virtual containers of another type that carry VNFs. The network hardware may be virtualized by using a technology such as a virtual LAN (VLAN for short), a virtual private local area network service (English: Virtual Private LAN Service, VPLS for short), a Virtual Extensible Local Area Network (VxLAN for short), or Network Virtualization using Generic Routing Encapsulation (NVGRE for short).

The OSS/BSS 106 mainly provides a telecommunications service operator with comprehensive network management and business operation functions, including network management (such as fault monitoring or network information collection), accounting management, customer service management, and the like. The service, VNF and infrastructure description system 105 is described in detail in the ETSI GS NFV 002 v1.1.1 standard. Details are not described herein in this embodiment of the present invention.

The NFV-MANO 101 may be configured to monitor and manage the VNF 103 and the NFVI 102. The NFVO 107 may communicate with the one or more VNFMs 108 to implement a resource-related request, to send configuration information to the VNFM 108, and to collect status information of the VNF 103. In addition, the NFVO 107 may communicate with the VIM 109 to implement resource allocation and/or to implement reservation and exchange of configuration and status information of a virtualized hardware resource. The VNFM 108 may communicate with the VNF 103 and the EMS 104 under an instruction of the NFVO 107, to perform VNF 103 lifecycle management and implement exchange of configuration/status information, that is, responsible for creation, deletion, start, stop, and the like of the VNF 103. The VIM 109 may be configured to control and manage interaction between the VNF 103 and each of the computing hardware 110, the storage hardware 111, the network hardware 112, the virtual computing 113, the virtual storage 114, and the virtual network 115. For example, the VIM 109 may be configured to perform an operation of allocating a resource to the VNF 103. The VNFM 108 and the VIM 109 may communicate with each other to exchange virtualized hardware resource configuration and status information.

The NFVI 102 includes hardware and software that jointly establish a virtualized environment to deploy, manage, and execute the VNF 103. In other words, the hardware resource layer and the virtual resource layer are used to provide virtual resources to each VNF 103, for example, a virtual machine and/or a virtual container in another form.

The VNF 103 is virtualization of at least one network function. The network function is previously provided by a physical network device. In an implementation, the VNF 103 may be a virtualized mobility management entity (MME for short) node that is configured to provide all network functions provided by a typical non-virtualized MME device. In another implementation, the VNF 103 may be used to implement functions of some of all components provided on a non-virtualized MME device. One or more VNFs 103 may be deployed on a virtual machine (or a virtual container in another form). The EMS 104 may be configured to manage the one or more VNFs 103.

In this embodiment of the present invention, a set of VNFs having a specific relationship in a same policy (an affinity policy or an anti-affinity policy) is referred to as an affinity group. It should be noted that in this embodiment of the present invention, only a case in which an affinity policy is implemented on VNFs is described. In FIG. 1, affinity policy management is controlled by the NFVO 107, and the VIM 109 is only responsible for executing an instruction delivered by the NFVO 107.

Figure 2:
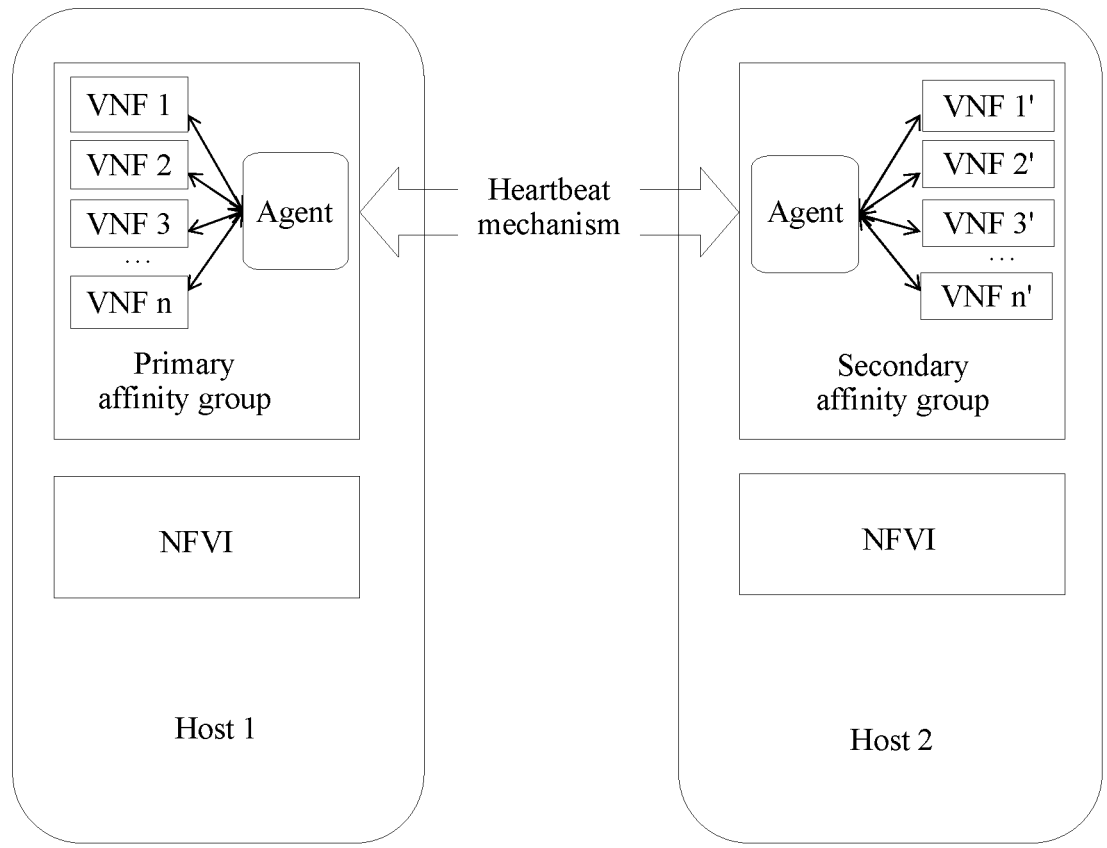
FIG. 2 is a schematic deployment diagram of a primary node and a secondary node according to an embodiment of the present invention.

In addition, for meeting availability and continuity requirements for a telecommunications-level service, an HA mechanism is used in this embodiment of the present invention. As shown in FIG. 2, VNFs are deployed on a primary node and a secondary node in a unit of an affinity group. Each affinity group includes several VNFs. A primary affinity group and a secondary affinity group need to be deployed on different hosts. Each VNF in the primary affinity group corresponds to a VNF in the secondary affinity group. As shown in FIG. 2, a VNF 1 in the primary affinity group corresponds to a VNF 1' in the secondary affinity group, and a VNF n corresponds to a VNF n'. An agent may be responsible for monitoring VNFs in each affinity group. An agent of the secondary affinity group detects, by using a heartbeat mechanism, whether a VNF in the primary affinity group is faulty. Alternatively, VNFs in each affinity group may be monitored by the upper-layer NFVI by using a detection mechanism of the NFVI. When any VNF in the primary affinity group is faulty, services that are currently processed by all VNFs in the primary affinity group are respectively handed over to corresponding VNFs in the secondary affinity group to continue to perform processing.

In FIG. 1, a primary-secondary relationship of the VNF 103 is managed by the NFVO 107, and the VIM 109 does not perceive the relationship.

Figure 3:
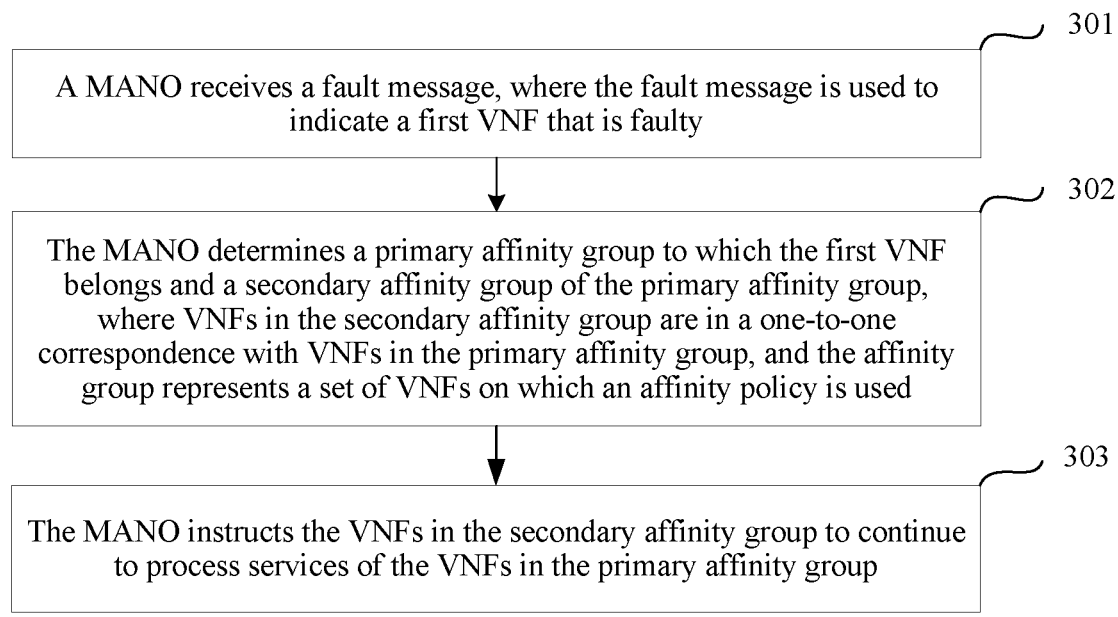
FIG. 3 is a flowchart of a VNF failover method according to an embodiment of the present invention.

An embodiment of the present invention provides a VNF failover method. As shown in FIG. 3, an implementation procedure of the method is as follows:

Step 301: A MANO receives a fault message, where the fault message indicates a first VNF is faulty.

Step 302: The MANO determines a primary affinity group to which the first VNF belongs and a secondary affinity group corresponding to the primary affinity group, where VNFs in the secondary affinity group are in a one-to-one correspondence with VNFs in the primary affinity group, and the affinity group represents a set of VNFs on which an affinity policy is used.

Step 303: The MANO instructs the VNFs in the secondary affinity group to continue to process services of the VNFs in the primary affinity group.

Optionally, the MANO may be split into two functional modules: an NFVO and a VNFM. A specific implementation process of steps 301 to 303 is as follows:

The NFVO receives the fault message reported by the VNFM. Then, the NFVO determines the primary affinity group to which the first VNF belongs and the secondary affinity group of the primary affinity group. Finally, the NFVO instructs the VNFs in the secondary affinity group to continue to process the services of the VNFs in the primary affinity group.

Optionally, the fault message may be reported to the VNFM in the following three manners:

In a first implementation, the fault message may be reported by an agent of the secondary affinity group to the VNFM after the agent detects, by using a heartbeat mechanism, that the first VNF is faulty.

In a second implementation, the fault message may be reported by an NFVI to a VIM after the NFVI detects a fault that is in the NFVI and that is to affect running of the first VNF, and then be reported by the VIM to the VNFM.

In a third implementation, the fault message may be notified by the NFVI to the first VNF after the NFVI detects a fault that is in the NFVI and that is to affect running of the first VNF, and then be reported by the first VNF to the VNFM.

In the second and the third implementations, the NFVI detects, by using a detection mechanism of the NFVI, that a fault occurs in a resource in the NFVI. The fault may result in a case that the first VNF cannot run or runs in a degraded manner after a specific time. However, at a current moment, the fault is not detected by using the heartbeat mechanism between the primary affinity group and the secondary affinity group. Therefore, the fault message may be reported by using two approaches: NFVI→VIM→VNFM or NFVI-→fault-related VNF→VNFM.

Performing primary/secondary failover only on a single VNF in the primary affinity group violates a limitation of the affinity policy on a host. Therefore, failover of all the VNFs in the primary affinity group as a whole is selected in this embodiment of the present invention, so that each VNF in the secondary affinity group takes over a service of a corresponding VNF in the primary affinity group. A failover process may be specifically implemented by updating a forwarding path, that is, the NFVO instructs the VIM (or a software-defined network controller) to delete a forwarding path between each VNF in the primary affinity group and a respective service object, and establish a new forwarding path between each service object and a corresponding VNF in the secondary affinity group; or may be implemented by using the virtual Internet Protocol (IP for short), that is, a virtual IP address of each VNF in the primary affinity group is failed over to a corresponding VNF in the secondary affinity group.

Optionally, after determining the primary affinity group to which the first VNF belongs and the secondary affinity group of the primary affinity group, the NFVO may further change an attribute of the secondary affinity group and an attribute of the VNF in the secondary affinity group to primary attributes in a database.

Figure 4:
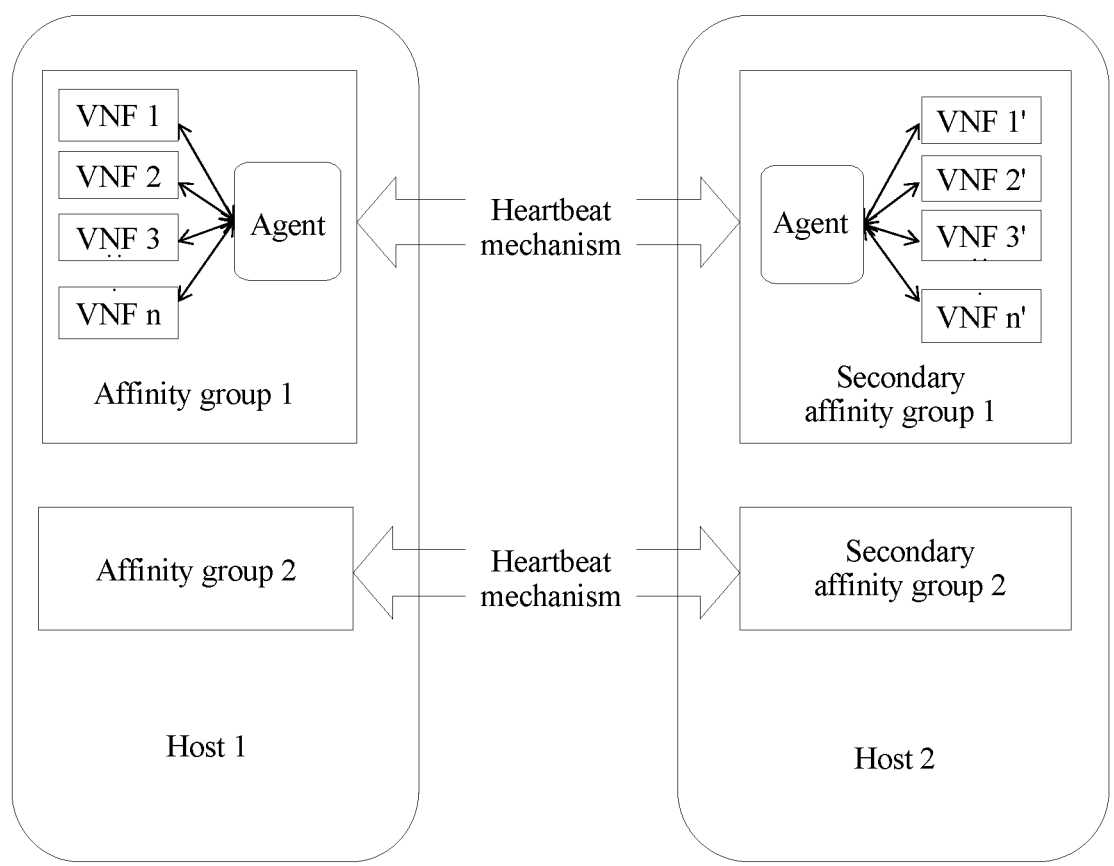
FIG. 4 is a schematic diagram in which VNFs in an affinity group are distributed on one host according to an embodiment of the present invention.
Figure 5:
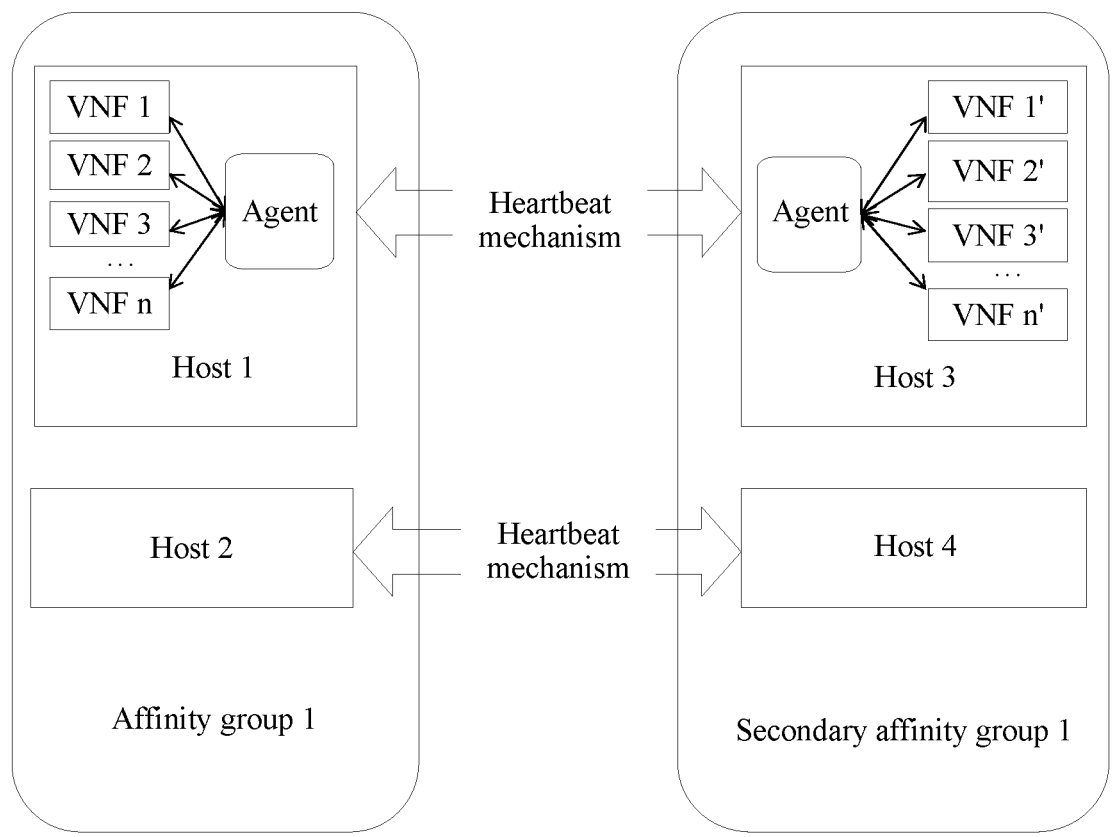
FIG. 5 is a schematic diagram in which VNFs in an affinity group are distributed on different hosts according to an embodiment of the present invention.

Optionally, the VNFs in the affinity group (the primary affinity group or the secondary affinity group) may be distributed on one host. For example, as shown in FIG. 4, all VNFs in an affinity group 1 and those in an affinity group 2 are deployed on a host 1, and all VNFs in a secondary affinity group 1 and those in a secondary affinity group 2 are deployed on a host 2. Alternatively, the VNFs in the affinity group may be distributed on multiple hosts. For example, as shown in FIG. 5, VNFs in an affinity group 1 are distributed on a host 1 and a host 2, and VNFs in a secondary affinity group 1 are distributed on a host 3 and a host 4.

Figure 6:
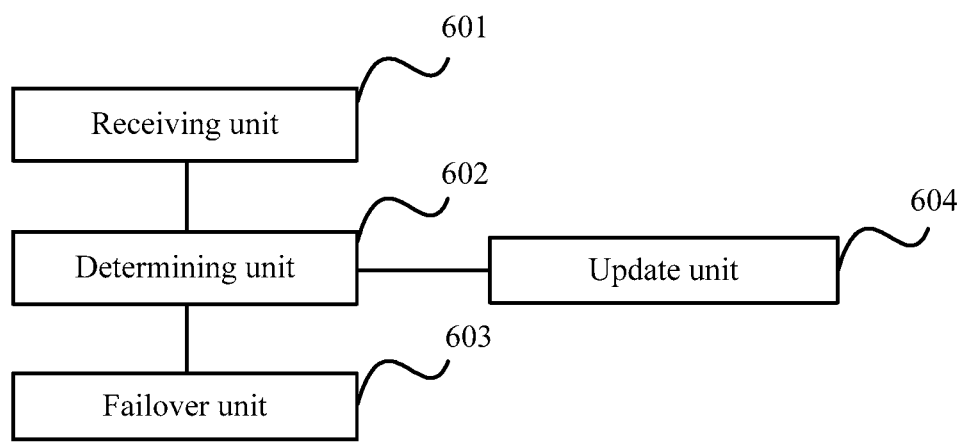
FIG. 6 is a schematic structural diagram of a VNF failover apparatus according to an embodiment of the present invention.

As shown in FIG. 6, an embodiment of the present invention provides a VNF failover apparatus to implement the VNF failover method shown in FIG. 3 in the present invention. The apparatus may be located in a MANO. The apparatus includes:

a receiving unit 601, configured to receive a fault message, where the fault message indicates a first VNF is faulty;

a determining unit 602, configured to determine a primary affinity group to which the first VNF belongs and a secondary affinity group corresponding to the primary affinity group, where VNFs in the secondary affinity group are in a one-to-one correspondence with VNFs in the primary affinity group, and the affinity group represents a set of VNFs on which an affinity policy is used; and a failover unit 603, configured to instruct the VNFs in the secondary affinity group to continue to process services of the VNFs in the primary affinity group.

Optionally, the receiving unit 601 is specifically configured to receive the fault message reported by a VNFM.

Optionally, the apparatus further includes:

an update unit 604, configured to change an attribute of the secondary affinity group and an attribute of the VNF in the secondary affinity group to primary attributes.

Optionally, the fault message may be reported by an agent of the secondary affinity group to the VNFM after the agent detects, by using a heartbeat mechanism, that the first VNF is faulty. Alternatively, the fault message may be reported by an NFVI to a virtualized infrastructure manager VIM after the NFVI detects a fault that is in the NFVI and that is to affect running of the first VNF, and then be reported by the VIM to the VNFM. Alternatively, the fault message may be notified by the NFVI to the first VNF after the NFVI detects a fault that is in the NFVI and that is to affect running of the first VNF, and then be reported by the first VNF to the VNFM.

Optionally, the VNFs in the affinity group are distributed on one host, or are distributed on multiple hosts.

In conclusion, according to the technical solution provided in this embodiment of the present invention, when receiving a fault message related to a VNF in the affinity group, the MANO triggers failover of all the VNFs in the affinity group at a first time. Therefore, a problem that the affinity policy cannot be compatible with the HA mechanism in the NFV scenario is resolved, and management of the affinity policy and primary/secondary failover is centralized into the MANO, so as to avoid control capability decentralization.

Persons skilled in the art should understand that the embodiments of the present invention may be provided as a method, a system, or a computer program product. Therefore, the present invention may use a form of hardware only embodiments, software only embodiments, or embodiments with a combination of software and hardware. In addition, the present invention may use a form of a computer program product that is implemented on one or more computer-usable storage media (including but not limited to a magnetic disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some specific embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the scope of the embodiments of the present invention. The present invention is intended to cover these modifications and variations of the embodiments of the present invention provided that they fall within the scope of protection defined by the following claims of the present invention and their equivalent technologies.

What is claimed is:

1. A virtualized network function (VNF) failover method, comprising:

receiving, by a management and orchestration (MANO) system comprising a network functions virtualization orchestrator (NFVO) and a virtualized network function manager (VNFM), a fault message, wherein the fault message indicates a first VNF is faulty;

determining, by the MANO system, a primary affinity group to which the first VNF belongs and a secondary affinity group corresponding to the primary affinity group, wherein VNFs in the secondary affinity group are in a one-to-one correspondence with VNFs in the primary affinity group, and the primary affinity group or the secondary affinity group represents a set of VNFs on which an affinity policy is used; and instructing, by the MANO system, the VNFs in the secondary affinity group to continue to process services of the VNFs in the primary affinity group, wherein the receiving comprises:

receiving, by the NFVO, the fault message reported by the VNFM, and wherein the determining comprises:

determining, by the NFVO, the primary affinity group to which the first VNF belongs and the secondary affinity group of the primary affinity group.

2. The method according to claim 1, wherein after the determining, by the NFVO, the primary affinity group to which the first VNF belongs and the secondary affinity group of the primary affinity group, the method further comprises:

changing, by the NFVO, an attribute of the secondary affinity group and an attribute of the VNF in the secondary affinity group to primary attributes.

3. The method according to claim 1, wherein the fault message is reported by an agent of the secondary affinity group to the VNFM after the agent detects, by using a heartbeat mechanism, that the first VNF is faulty.

4. The method according to claim 1, wherein the fault message is reported by a network functions virtualization infrastructure (NFVI) to a virtualized infrastructure manager (VIM) after the NFVI detects a fault that is in the NFVI and that is to affect running of the first VNF, and then is reported by the VIM to the VNFM.

5. The method according to claim 1, wherein the fault message is notified by a network functions virtualization infrastructure (NFVI) to the first VNF after NFVI detects a fault that is in the NFVI and that is to affect running of the first VNF, and then is reported by the first VNF to the VNFM.

6. The method according to claim 1, wherein the VNFs in the primary affinity group are distributed on one host or are distributed on multiple hosts.

7. A virtualized network function (VNF) failover apparatus located in a management and orchestration (MANO) system comprising a network functions virtualization orchestrator (NFVO) and a virtualized network function manager (VNFM), comprising:

a processor; and a non-transitory computer readable storage medium storing a program for execution by the processor, the program comprising instructions for:

receiving a fault message, wherein the fault message indicates a first VNF is faulty;

determining a primary affinity group to which the first VNF belongs and a secondary affinity group corresponding to the primary affinity group, wherein VNFs in the secondary affinity group are in a one-to-one correspondence with VNFs in the primary affinity group, and the primary affinity group or the secondary affinity group represents a set of VNFs on which an affinity policy is used; and instructing the VNFs in the secondary affinity group to continue to process services of the VNFs in the primary affinity group, wherein the receiving comprises:

receiving, by the NFVO, the fault message reported by the VNFM, and wherein the determining comprises:

determining, by the NFVO, the primary affinity group to which the first VNF belongs and the secondary affinity group of the primary affinity group.

8. The VNF failover apparatus according to claim 7, wherein the instructions further comprise:

changing an attribute of the secondary affinity group and an attribute of the VNF in the secondary affinity group to primary attributes.

9. The VNF failover apparatus according to claim 7, wherein the VNFs in the primary affinity group are distributed on one host or are distributed on multiple hosts.

10. The VNF failover apparatus according to claim 7, wherein the fault message is reported by a network functions virtualization infrastructure (NFVI) to a virtualized infrastructure manager (VIM) after the NFVI detects a fault that is in the NFVI and that is to affect running of the first VNF, and then is reported by the VIM to the VNFM.

11. The VNF failover apparatus according to claim 7, wherein the fault message is notified by a network functions virtualization infrastructure (NFVI) to the first VNF after NFVI detects a fault that is in the NFVI and that is to affect running of the first VNF, and then is reported by the first VNF to the VNFM.

12. The VNF failover apparatus according to claim 7, wherein the VNFs in the primary affinity group are distributed on one host or are distributed on multiple hosts.

13. A non-transitory computer readable storage medium storing a program to be executed by a processor located in a management and orchestration (MANO) system comprising a network functions virtualization orchestrator (NFVO) and a virtualized network function manager (VNFM), the program comprising instructions for:

receiving a fault message, wherein the fault message indicates a first virtualized network function (VNF) is faulty;

determining a primary affinity group to which the first VNF belongs and a secondary affinity group corresponding to the primary affinity group, wherein VNFs in the secondary affinity group are in a one-to-one correspondence with VNFs in the primary affinity group, and the primary affinity group or the secondary affinity group represents a set of VNFs on which an affinity policy is used; and instructing the VNFs in the secondary affinity group to continue to process services of the VNFs in the primary affinity group, wherein the receiving comprises:

receiving, by the NFVO, the fault message reported by the VNFM, and wherein the determining comprises:

determining, by the NFVO, the primary affinity group to which the first VNF belongs and the secondary affinity group of the primary affinity group.

14. The non-transitory computer readable storage medium according to claim 13, wherein the instructions further comprise:

changing an attribute of the secondary affinity group and an attribute of the VNF in the secondary affinity group to primary attributes.

15. The non-transitory computer readable storage medium according to claim 13, wherein the fault message is reported by a network functions virtualization infrastructure (NFVI) to a virtualized infrastructure manager (VIM) after the NFVI detects a fault that is in the NFVI and that is to affect running of the first VNF, and then is reported by the VIM to the VNFM.

16. The non-transitory computer readable storage medium according to claim 13, wherein the fault message is notified by a network functions virtualization infrastructure (NFVI) to the first VNF after NFVI detects a fault that is in the NFVI and that is to affect running of the first VNF, and then is reported by the first VNF to the VNFM.

17. The non-transitory computer readable storage medium according to claim 13, wherein the VNFs in the primary affinity group are distributed on one host or are distributed on multiple hosts.

* * * * *